United States Patent
Park

(10) Patent No.: US 11,097,381 B2
(45) Date of Patent: Aug. 24, 2021

(54) FILLER WIRE FOR BRAZING ALUMINUM AND STEEL

(71) Applicants: Hyundai Motor Company, Seoul (KR); Kia Motors Corporation, Seoul (KR)

(72) Inventor: Sang-Cheon Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 164 days.

(21) Appl. No.: 16/443,004

(22) Filed: Jun. 17, 2019

(65) Prior Publication Data

US 2020/0016698 A1 Jan. 16, 2020

(30) Foreign Application Priority Data

Jul. 10, 2018 (KR) .......................... 10-2018-0080079

(51) Int. Cl.
| | |
|---|---|
| *B23K 35/28* | (2006.01) |
| *B23K 35/02* | (2006.01) |
| *B23K 35/362* | (2006.01) |
| *B23K 103/10* | (2006.01) |
| *B23K 103/04* | (2006.01) |

(52) U.S. Cl.
CPC ........ *B23K 35/286* (2013.01); *B23K 35/0227* (2013.01); *B23K 35/282* (2013.01); *B23K 35/362* (2013.01); *B23K 2103/04* (2018.08); *B23K 2103/10* (2018.08); *Y10T 428/12736* (2015.01)

(58) Field of Classification Search
None
See application file for complete search history.

(56) References Cited

U.S. PATENT DOCUMENTS

| | | | | |
|---|---|---|---|---|
| 6,329,021 | B1* | 12/2001 | Haug | ........................ C23C 4/04 219/146.22 |
| 8,696,829 | B2* | 4/2014 | Schmitt | .............. B23K 35/0244 148/24 |
| 2017/0274479 | A1* | 9/2017 | Katoh | .................. B23K 35/406 |

FOREIGN PATENT DOCUMENTS

KR 10-2013-0133840 A 12/2013

* cited by examiner

*Primary Examiner* — Daniel J. Schleis
(74) *Attorney, Agent, or Firm* — Mintz Levin Cohn Ferris Glovsky and Popeo, P.C.; Peter F. Corless

(57) ABSTRACT

A filler wire may include a rod including an aluminum-silicon (Al—Si) alloy powder and a fluoride flux powder, and a sheath including zinc (Zn) alloy and surrounding the rod.

13 Claims, 15 Drawing Sheets

MIXTURE OF AlSi ALLOY + FLUX POWDER

Flux Mixed Rod
(FMR)

FILLER WIRE FOR BRAZING ALUMINUM AND STEEL

CROSS-REFERENCE(S) TO RELATED APPLICATIONS

This application claims priority to Korean Patent Application No. 10-2018-0080079, filed on Jul. 10, 2018, which is incorporated herein by reference in its entirety.

TECHNICAL FIELD

The present invention relates to a filler wire for joining different materials such as aluminum and steel.

BACKGROUND

When aluminum and steel are welded, solubility with respect to each other is extremely low so that stable alloy is not formed and intermetallic compound having high brittleness is formed. As result, joining strength may not be secured.

For this reason, in vehicles, ships, aerospace industries and the like, as joining between aluminum and steel, a mechanical joining such as rivets and the like has been mostly applied despite an increase in cost and weight, and welding or brazing have not been applied to mass production.

In order to secure a thermal joining strength between two metals, in the early 2000s, the Welding-Brazing (self-brazing) technology, in which aluminum base material is melted together with aluminum based or zinc based solid filler wire and is brazed to a surface of steel base material which is in a solid state, has been developed.

However, the self-brazing technology has been used valid only for steel with certain plating layers such as galvanized steel (GI), and in galvannealed steel (GA) or uncoated steel, a thickness of Al—Fe intermetallic compound may not be properly controlled, so that interfacial fracture may occur between a brazing shim and steel base material in a tensile shear evaluation. On the other hand, chloride or fluoride flux has been used to remove oxide or foreign substances on a surface of a base material to decrease interface generation energy when brazing melted aluminum to galvannealed steel or uncoated steel, thereby facilitating a control for a thickness of Al—Fe intermetallic compound.

Using the above advantages, in the related arts, as shown in FIG. 1, a flux cored filler wire (FCW) formed of a solid wire (sheath) and flux inserted into the solid wire has been applied to galvannealed steel or uncoated steel.

In the case of such the flux cored filler wire, the flux may be agglomerated in the aluminum-silicon sheath and may be efficiently spread during brazing, so that the flux may not react with a base material. In addition, some of the flux may remain on the surface after brazing to generate a large amount of sludge as shown in FIG. 2 or may not to form a stable brazing interface as shown in FIG. 3. As a result, an un-joined region may easily generated.

In addition, the unstably vaporized flux may generate a large number of pores in a brazing seam as shown in FIG. 4, which may also act as a factor to deteriorate the joining strength. For example, when the flux is used, a time for stably reacting the flux with the base material is required, which makes it difficult to secure stable brazing interface at high speed.

Most of brazing utilizing the flux cored filler wire may be applied at a speed of 1 m/min or less, and an actual laser brazing process for a vehicle body may be generally performed under the condition of 3 m/min or greater.

Therefore, in order to solve the disadvantage of the above described flux cored filler wire, a flux mixed rod (FMR) obtained by mixing aluminum-based sheath and flux which are in a powder state as shown in FIG. 5 has been tested.

In the flux mixed rod, flux powder may be uniformly distributed in aluminum alloy powder which will constitute a brazing seam, so that stable surface reaction of the base material may be performed during brazing such that external appearance may be improved and a joining bonding strength may be improved as compared with the flux cored filler wire.

However, because the flux mixed rod is made by extruding mixed powder, the material itself has very low ductility, so that even slight deformation causes fracture as shown in FIG. 6. Accordingly, the flux mixed rod may not be winded onto a wheel like a conventional filler wire for brazing and to use it for laser or arc brazing. Therefore, most of the flux mixed rods may be cut thinly and placed on the base material and then used in furnace brazing.

However, furnace brazing may not be applied in the process for assembling a body of transportation means such as a vehicle, a ship, an airplane, and the like in terms of productivity, and since brazing using laser or arc is applied in most process, an application of flux mixed type filler metal to mass production in the transportation means industry may be significantly limited.

In addition, when the flux mixed rod is employed, an interface may be stably formed only at low speed (e.g., 1 m/min.), and at high speed, like the flux cored filler wire, an un-joined region between a brazing seam and steel base material base material may occur and it is difficult to secure the desired joining strength.

The contents described in Description of Related Art are to help the understanding of the background of the present invention, and may include what is not previously known to those skilled in the art to which the present invention pertains.

SUMMARY OF THE INVENTION

In preferred aspects, the present invention provides a filler wire for brazing aluminum and steel, which may secure a joining strength of brazing between aluminum and steel and improve productivity.

In one aspect of the present invention, provided is a filler wire that may include a rod including an aluminum-silicon (Al—Si) alloy powder and a fluoride flux powder, and a sheath comprising a zinc (Zn) alloy and surrounding the rod.

The term "aluminum-silicon (Al—Si) alloy powder" as used herein refers to an alloy material that may be formed in particles or powder with diameters ranging from nanometers (e.g., 10-990 nm) to micrometers (e.g., 1 μm to 990 μm) without limitation to shapes or weights thereof. Preferably, the powder may have a size (diameter measured at the maximum length) of about 100 nm to about 100 μm. In certain aspect, Al—Si alloy powder may include aluminum and silicon as main components, for example, an amount of about 50 wt %, 60 wt %, 70 wt %, 80 wt %, 85 wt %, 90 wt %, or 95 wt % or greater of aluminum and an amount of about 5 wt %, 10 wt %, 15 wt %, 20 wt %, 30 wt %, 40 wt %, or 50 wt % or greater of silicon based on the total weight of the alloy powder composition. Preferably, the powder may have a content of Al of about 70 wt % to 90 wt % and a content of Si of about 10 wt % to 30 wt %, a content of Al of about 80 wt % to 90 wt % and a content of Si of about 10 wt % to 20 wt %.

An "aluminum-silicon (Al—Si)" alloy as referred herein optionally may include one or more materials in addition to aluminum or silicon, or the alloy may consist essentially of, aluminum or silicon, or the alloy may consist of solely aluminum and silicon. It is appreciated that the Al—Si alloy may be obtained from 4000 series aluminum alloy, such as A4043, A4047 ISO AlSi5 and AlSi12, which may include further fabrication for suitably use (e.g., powder) herein.

The term "halide flux powder" as used herein refers to a flux material or an agent that may remove aluminum-oxide layer in the aluminum brazing or metal joining process and that may be formed in particles or powder with diameters ranging from nanometers (e.g., 10 nm to 990 nm) to micrometers (e.g., 1 μm to 990 μm) without limitation to shapes or weights thereof. Preferably, the powder may have a size (diameter measured at the maximum length) of about 100 nm to about 100 μm. Preferably, the halide flux material may be suitably applied during a brazing process, for example, to work properly when connecting a joint by brazing for assembling a body or parts of a vehicle, a ship, an airplane, and the like. The brazing may include an arc brazing, a laser brazing and a furnace brazing. In certain aspect, the halide flux powder may suitably include halide as additive, for example, in a form of halide compound, less than about 50 wt %, 40 wt %, 30 wt %, 25 wt %, 20 wt %, 15 wt %, 10 wt %, or 5 wt %, based on the total weight of the powder composition. It is appreciated that the halide flux powder is provided from halide flux materials, for example, NOCOLOK® or NOCOLOK® Flux 7028-9028 (Solvay, German), which may include further fabrication for suitably use herein.

The term "zinc (Zn) alloy" as used herein refers to an alloy material that includes zinc as a main component, for example, having a content of about 80 wt %, 85 wt %, 90 wt %, 92 wt %, 94 wt %, 96 wt %, 98 wt %, or 99 wt % based on the total weight of the alloy material. The zinc alloy may suitably further include other metallic elements (e.g., Al, Cu, Pb, Fe, Ca, Mg, or the like) or non-metallic elements (e.g., C, Si, N, P, S, O or the like).

The halide flux powder may be a fluoride flux powder or a chloride flux powder.

Preferably, the halide flux powder may be the fluoride flux powder.

The zinc alloy sheath may suitably have a thickness of about D/2×0.1 to D/2×0.5 wherein D is a diameter of the filler wire.

In addition, a plurality of bending grooves may be formed on the filler wire at a predetermined intervals in a longitudinal direction.

A length of each of the bending grooves in a longitudinal direction may suitably be about D to D×10 wherein D is a diameter of the filler wire.

Furthermore, the predetermined distance between the bending grooves may be equal to or less than about D×30.

In addition, each of the bending grooves may suitably have a depth of about D/2×0.1 to D/2×0.7.

Each of the bending grooves may have a longitudinal length of about D to D×10 and a depth of about D/2×0.1 to D/2×0.7, and the predetermined distance between the bending grooves may be equal to or less than about D×30 wherein D is a diameter of the filler wire.

Meanwhile, the zinc alloy sheath may suitably include aluminum in an amount of about 3 to 20% and silicon in an amount of about 0.1 to 1.0% based on total weight of the zinc alloy sheath.

Further provided is a method of joining parts. The method may include applying the filler wire as described herein at a brazing portion, and the brazing portion may join one or more parts comprising different materials.

The "different materials" as used herein refers to two more materials that may be differentiated from each other by its composition, contents of the components, physical properties (e.g., hardness, tensile strength, yield strength and the like), or weights thereof. Preferably, the different materials may include, respectively, aluminum alloy, and steel (e.g., iron alloy, carbon steel or the like) which may form parts and be joined by brazing. For example, the different materials may include aluminum alloy and steel.

Also provided is a vehicle manufactured by the method described herein.

Other aspects of the invention are disclosed infra.

DETAILED DESCRIPTION

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

In order to fully understand the present invention, operational advantages of the present invention, objects achieved by various exemplary embodiments of the present invention, reference should be made to the accompanying drawings and contents illustrated in the accompanying drawings which illustrate the exemplary embodiments of the present invention.

In describing the exemplary embodiments of the present invention, well-known techniques or repetitive descriptions that may unnecessarily obscure the gist of the present invention will be reduced or omitted.

Figure 1:
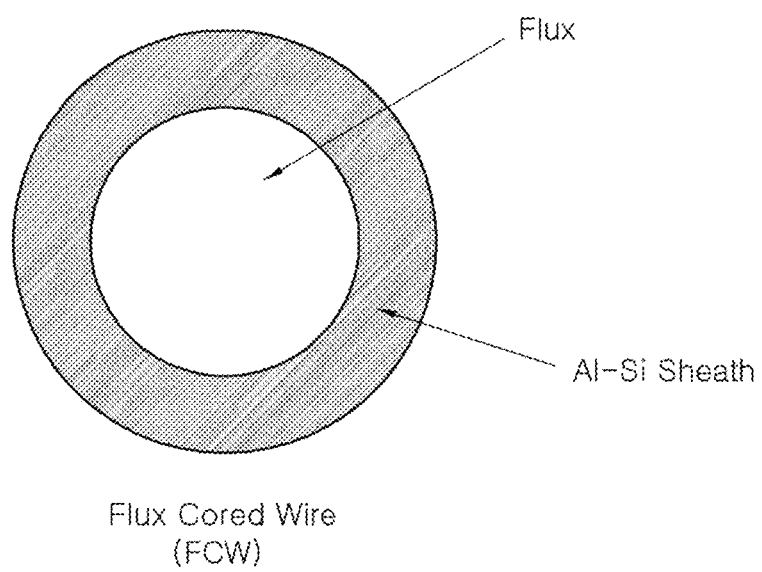
FIG. 1 is a view illustrating a conventional flux cored filler wire in the related art.
Figure 2:
FIG. 2 shows an exemplary problem caused by the conventional flux cored filler wire in the related art.
Figure 3:
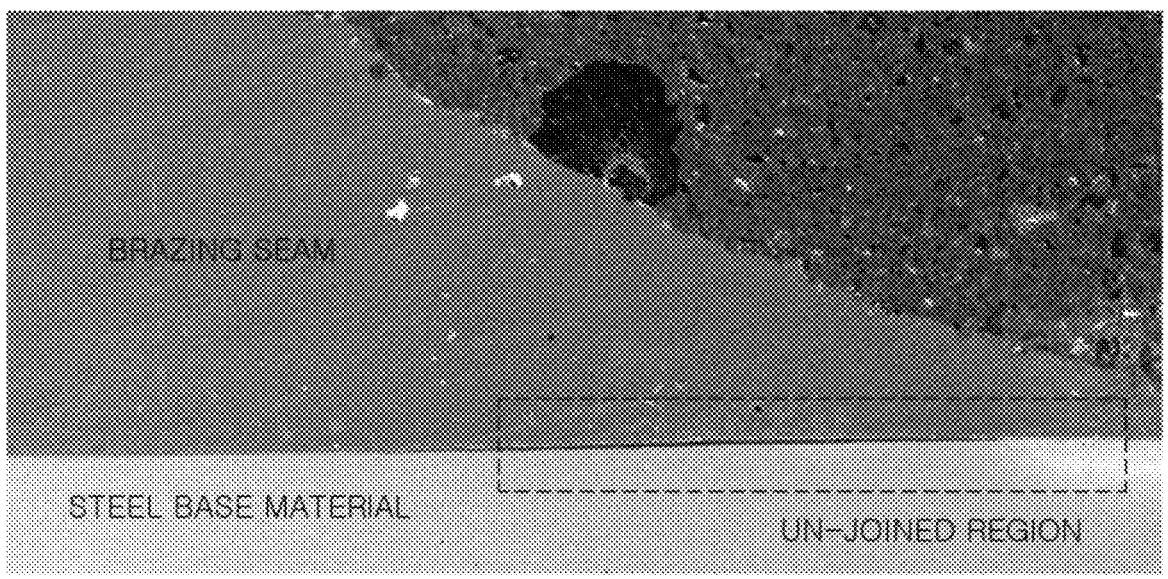
FIG. 3 shows another exemplary problem caused by the conventional flux cored filler wire in the related arts.
Figure 4:
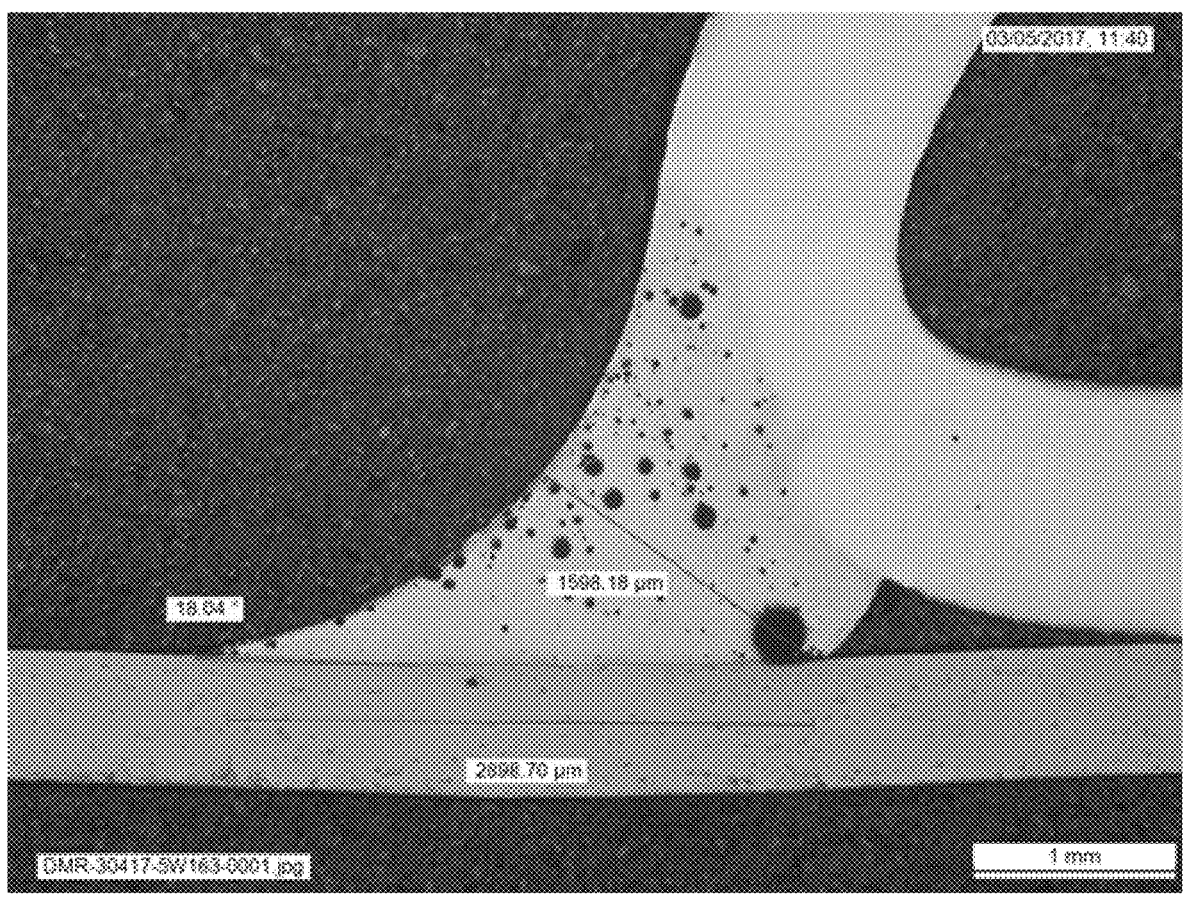
FIG. 4 shows another exemplary problem caused by the conventional flux cored filler wire in the related art.
Figure 5:
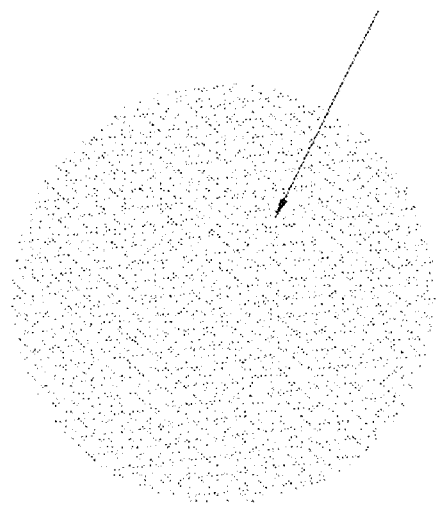
FIG. 5 shows a conventional flux mixed rod in the related art.
Figure 6:
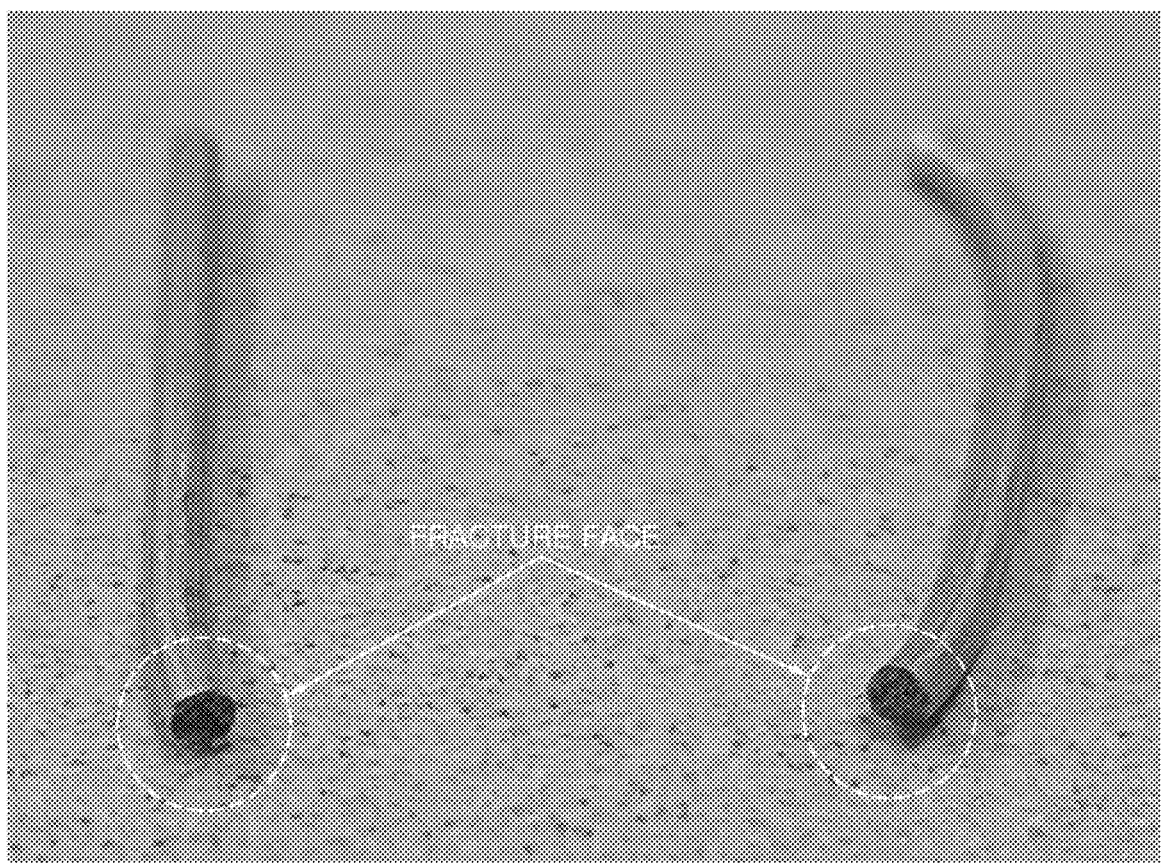
FIG. 6 shows a problem caused by the conventional flux mixed rod in the related art.
Figure 7:
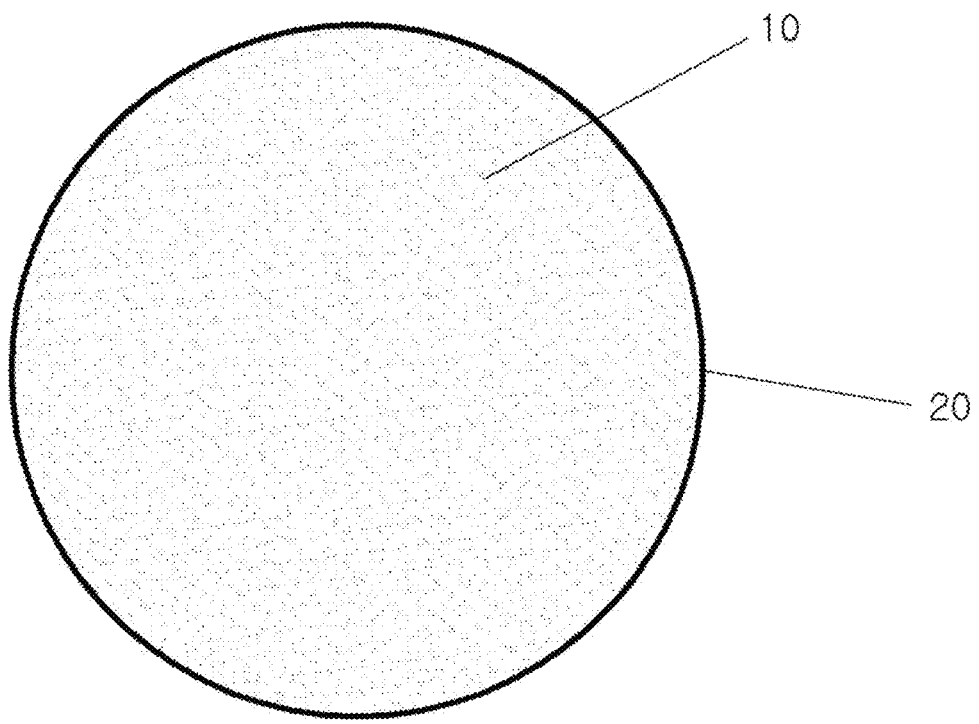
FIG. 7 shows a widthwise directional section of an exemplary filler wire according to an exemplary embodiment of the present invention.
Figure 8:
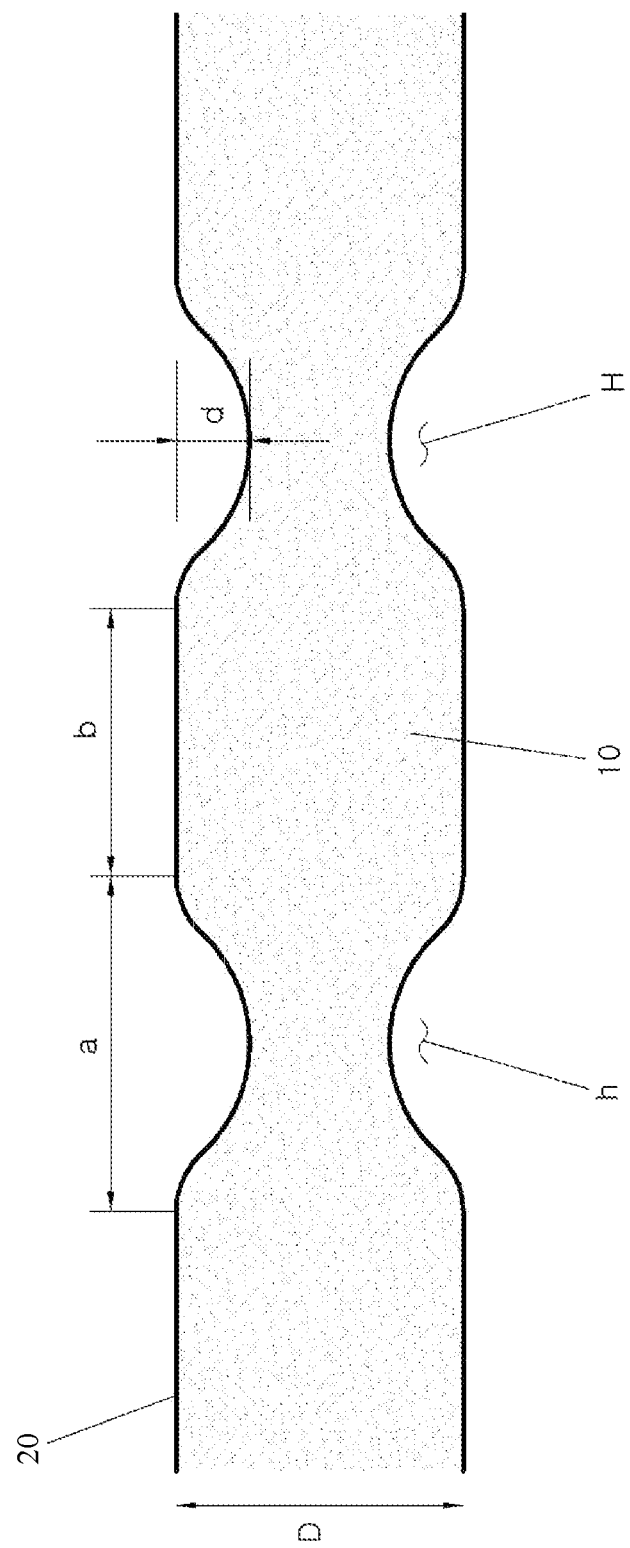
FIG. 8 shows a lengthwise directional section of an exemplary filler wire according to an exemplary embodiment of the present invention.

FIG. 7 shows a widthwise directional section of an exemplary filler wire according to an exemplary embodiment of the present invention, and FIG. 8 shows a lengthwise directional section of an exemplary filler wire according to an exemplary embodiment of the present invention.

Hereinafter, the filler wire for brazing aluminum and steel according to an exemplary embodiment of the present invention with reference to FIGS. 7 and 8.

The present invention provides a filler wire which may be applied to secure a joining strength when brazing is performed between aluminum and steel, and to secure the joining strength between aluminum and steel such that productivity may be improved as compared with a conventional flux cored filler wire or flux mixed rod.

Preferably, the stable joining strength between aluminum and Fe which have low solubility may be improved and secured, and residue such as sludge and the like may be minimized after brazing to obtain favorable appearance. In addition, the wire may not be deformed or fractured when the wire manufactured and wound around a wheel is released and fed to a laser or arc heat source. Further, the joining strength may be stably secured without interfacial fracture of the wire even under high-speed brazing conditions (e.g., 3 m/min.).

The present invention may provide a flexible zinc (Zn) sheath-flux mixed wire (FMW) capable of satisfying the above-mentioned conditions. FIGS. 7 and 8 are views showing thicknesswise and lengthwise directional sections, respectively, of the above wire.

The filler wire of the present invention may be formed in by wrapping a rod 10 made of alloy powder (hereinafter, referred to as "alloy-powdered rod") with an alloy sheath 20. In other words, the filler wire may include a rod 10 including an alloy powder and a sheath 20 including an alloy (e.g., zinc alloy).

For example, in order to improve the process of feeding the flux mixed rod, the zinc alloy sheath 20 may be in closely contact with and wrapped around the alloy-powdered rod 10 at a high pressure.

The alloy-powdered rod 10 may include aluminum-silicon (Al—Si) alloy powder and halide flux powder.

The Al—Si powder can be formed by powdering an alloy mixed aluminum and silicon.

In addition, the Al—Si alloy powder can be applied an Al—Si alloy for brazing in general.

The halide flux powder may include a fluoride flux powder and a chloride flux powder.

However, the fluoride flux powder is preferable to the chloride flux powder because the chloride flux powder can cause corrosion.

In addition, the zinc alloy sheath 20 may fix the inner alloy powder of the rod so that the alloy powder may be fed to a target point without being broken or deformed when the wire (rod) is bent.

However, a thickness t of the zinc alloy sheath 20 may suitably be in a certain range in order to prevent the problem that the inner powders are not dispersed well like the flux cored filler wire during brazing.

In addition, in order to improve bendability, a plurality of bending grooves H may be formed on the filler wire at regular intervals or at a predetermined distance in a longitudinal direction of the filler wires, so that deformation may be induced to a portion having a decreased radius when the wire is bent to prevent fracture of the alloy powder in the wire.

Spacing between the bending grooves H and a depth of each bending groove may be considered according to the thickness t of the zinc alloy sheath 20.

When the spacing between the bending grooves H is less than the predetermined distance, or the depth of each bending groove is greater than the predetermined range, the groove may act as a notch to generate fracture in a corresponding portion. On the contrary, when the spacing is greater than the predetermined distance, the effect of improving the bendability may not be expected.

These conditions should be determined in consideration of laser or arc brazing wire feeding conditions and wire-bendability, and may be summarized as shown in Table 1

TABLE 1

|  | Thickness of sheath (t; mm) | Longitudinal length (a; mm) | Spacing between bending grooves (b; mm) | Depth (d; mm) |
|---|---|---|---|---|
| Diameter (D) of wire | D/2 × 0.1~D/2 × 0.5 | D~D × 10 | Max. D × 30 | D/2 × 0.1~D/2 × 0.7 |

The zinc alloy sheath 20 may include aluminum in an amount of about 3 to 20 wt %, silicon in an amount of 0.1 to 1.0 wt % and zinc constituting the remaining balance of the zinc alloy sheath, when all wt % are based on the total weight of the zinc alloy sheath.

Zinc as used herein may provide high ductility and may be advantageous for bending deformation. For example, when aluminum is added to zinc, a melting point of zinc is decreased to a temperature of about 400° C. Since this melting point is much less than a melting point of about 500 to 600° C. of inner mixed powder, zinc may be molten first during brazing, and so zinc may not prevent the inner powder from being melted and flowing to a base material.

When aluminum and zinc are not within the predetermined content discussed above range, the zinc alloy sheath may have an increased melting point and adversely affect the brazing.

In addition, zinc and silicon as used herein may have high affinity with iron(Fe), so that when Fe of a steel base material, which is in solid state, may diffused into the molten wire and the aluminum base material at the time of brazing, zinc and silicon may inhibit the formation of Fe—Al based intermetallic compounds with high brittleness or form Fe—Al—Zn or Fe—Al—Si based intermetallic compounds having brittleness less than that of Fe—Al based intermetallic compounds. As a result, zinc and silicon may increase the brazing strength.

In particular, when silicon is added, silicon may effectively inhibit intermetallic compounds formation while forming an interface stably under the condition that heat input is inevitably increased during high-speed brazing.

However, when silicon content is increased, the melting point in the Al—Si—Zn ternary phase diagram may be sharply increased, so that the silicon content may not be used greater than about 1 wt %.

In addition, the zinc may form a thin layer between the mixed powder, which is starting to melt, and the steel base material to allow the molten mixed powder to spread throughout the steel base material in a short time, and to allow inner flux of the filler wire to react with the base material faster, thus promoting formation a brazing interface stably at high speed conditions.

According to various exemplary filler wires of the present invention as described above, which has a certain range of thickness, may have the certain bending grooves and may be configured by wrapping the alloy sheath made of mixed zinc, aluminum and silicon around the alloy-powdered rod. As such the joining strength and productivity may be improved when brazing is performed, thereby reducing the cost and weight as compared with a conventional mechanical joining between aluminum and steel.

Figure 9:
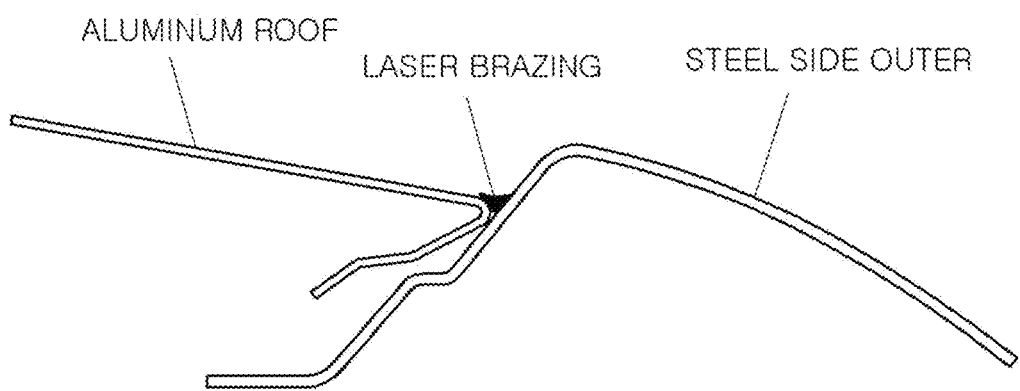
FIG. 9 shows an exemplary specimen to which an exemplary filler wire according to an exemplary embodiment of the present invention is applied.

FIG. 9 shows an exemplary test specimen for verifying the above described present invention, the test specimen has a roof-steel side outer joining structure. For example, a steel side outer and an aluminum roof were subjected to laser-brazing to which the filler wire of the present invention is applied, and the resultant was used as the test specimen.

As results, stable joining strength was obtained because fracture is not generated on the interface even under high speed condition (3 m/min) during brazing, and pores of less than about 3% was formed in a brazing seam, which is the condition satisfying the ISO 13919-2 standard.

In addition, no sludge or other residue was found on an external appearance of a brazing portion, which may eliminate an additional cleaning process after brazing.

Table 2 shows the test results of the test specimens according to Example of the present invention and Comparative Examples.

TABLE 2

|  | Criteria | Example 1 | Comparative Example 1 | Comparative Example 2 | Comparative Example 3 |
|---|---|---|---|---|---|
| Diameter of wire | — | 1.2 mm↑ | | | |
| Composition of Sheath (%) | — | Al; 15.0, Si; 0.5 and Zn; Rem. | Al; 15.0, Zn; Rem. | Al; 25.0, Si; 5.0 and Zn; Rem. | Zn100 |
| Brazing ratio | | 3 m/min. | | | |
| Whether fracture of wire occurs when feeding | Fracture x | Fracture x | Fracture x | Fracture x | — |
| Joining Strength (N/mm) | 140 (Interfacial fracture x) | 160 (Interfacial fracture x) | 120 (Interfacial fracture) | 110 (Interfacial fracture x) | — |
| External appearance | There should be no flux sludge and other contaminant | Good | Good | Good | — |
| Porous (%) | Less than 3 | 1.5 | 1.5 | 1.5 | — |
| Remark | . | — | The heat input is increased according to rapid laser transferring → It is necessary to further inhibit a formation of intermetallic compounds. | Expect a cause of increase of melting point of the sheath | Sheath fracture occurs during a process for pressing the flexible zinc sheath-flux mixed wire due to lack of sheath strength. |

As summarized in Table 2, when the filler wire of the Example of the present invention was used for brazing, no fracture occurred during wire feeding, as such, the satisfactory joining strength and an external appearance were obtained, and few pores were formed.

On the contrary, in Comparative Examples 1 and 2, the joining strength did not satisfy the criteria and partial interfacial fracture occurred.

Moreover, in Comparative Example 3 in which the sheath was made of only zinc, fracture of the sheath itself occurred.

Figure 10:
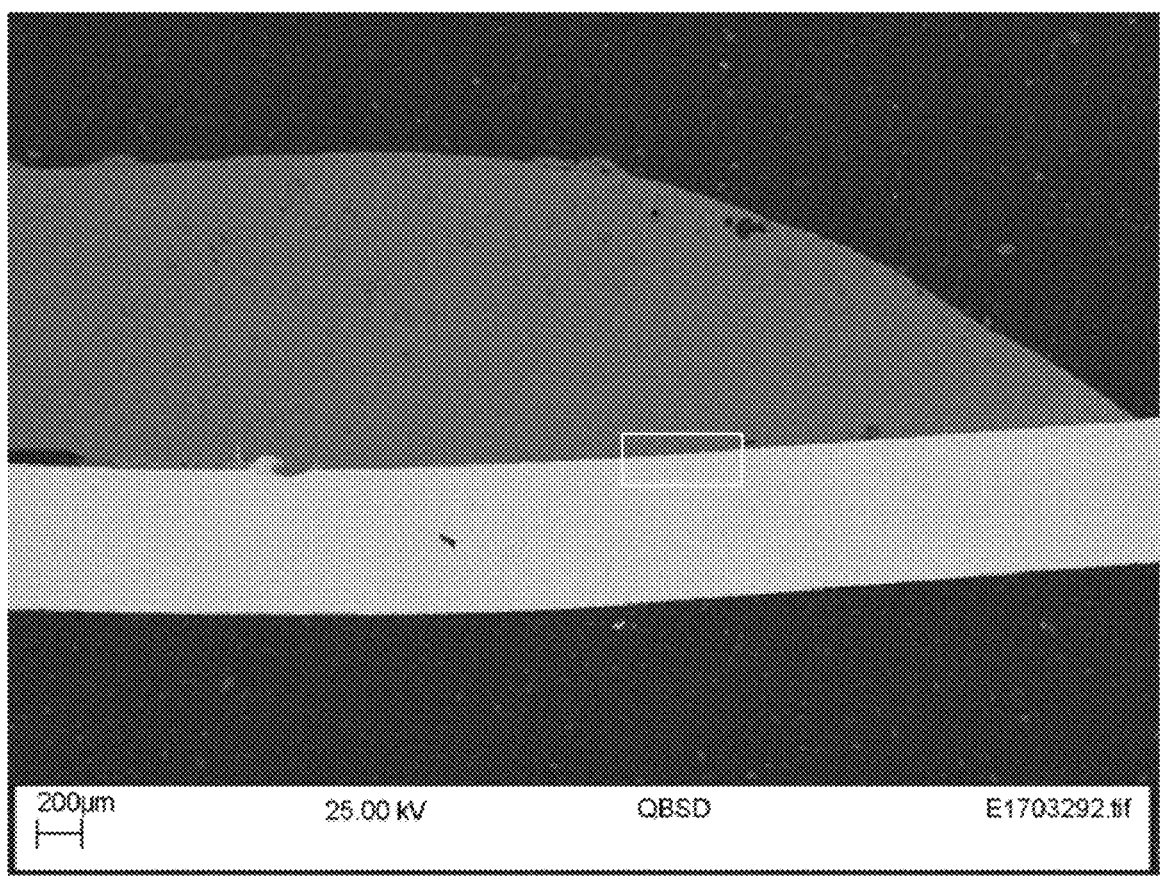
FIG. 10 shows an interface obtained by an exemplary embodiment of the present invention.
Figure 11:
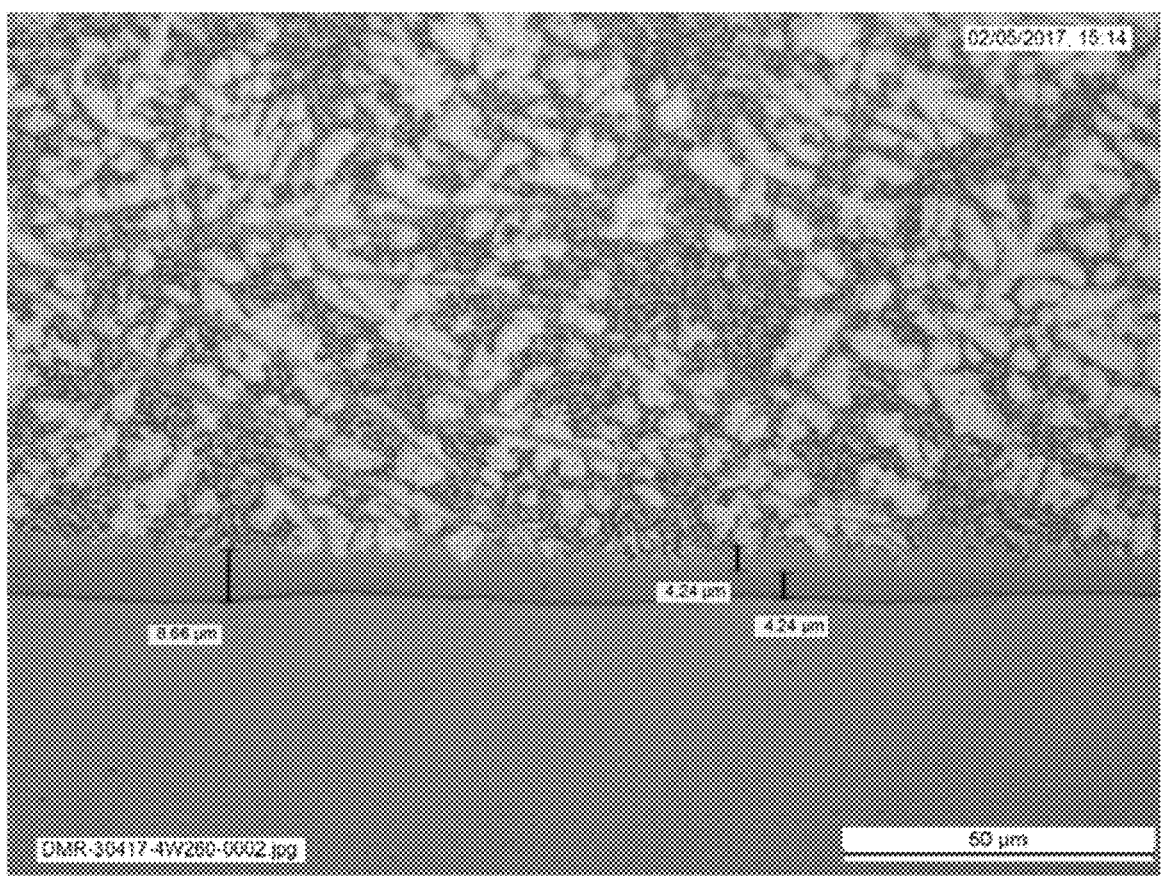
FIG. 11 shows a result of a scanning electron microscope (SEM) analysis for a portion of the interface shown in FIG. 10.

FIG. 10 shows an interface occurred in Example 1 and observed with an optical microscope, and FIG. 11 is a scanning electron microscope analysis result of a box portion in FIG. 10. For instance, in Example 1, wettability was improved, the intermetallic compound was controlled to be less than about 10 μm, and the stable joining strength was obtained without occurrence of interface cracks.

Figure 12:
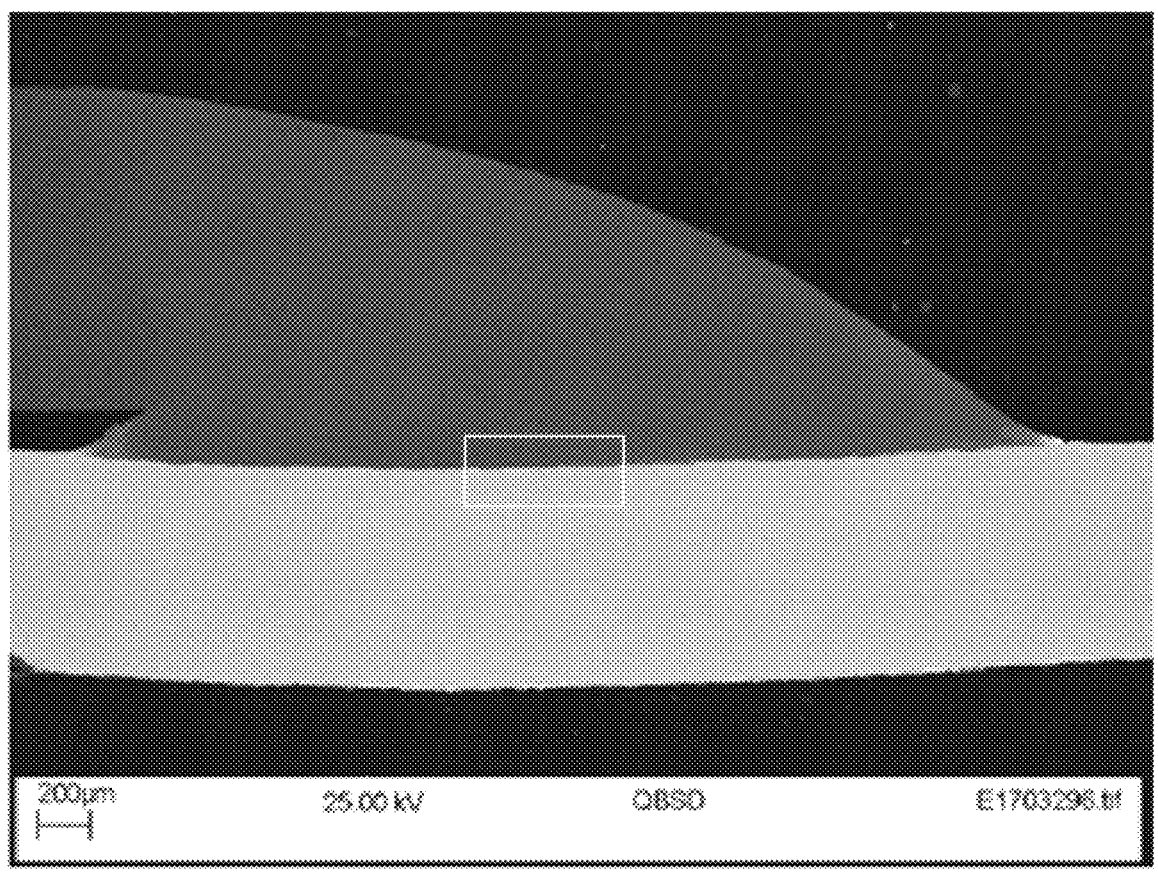
FIG. 12 shows an interface obtained by a comparative example.
Figure 13:
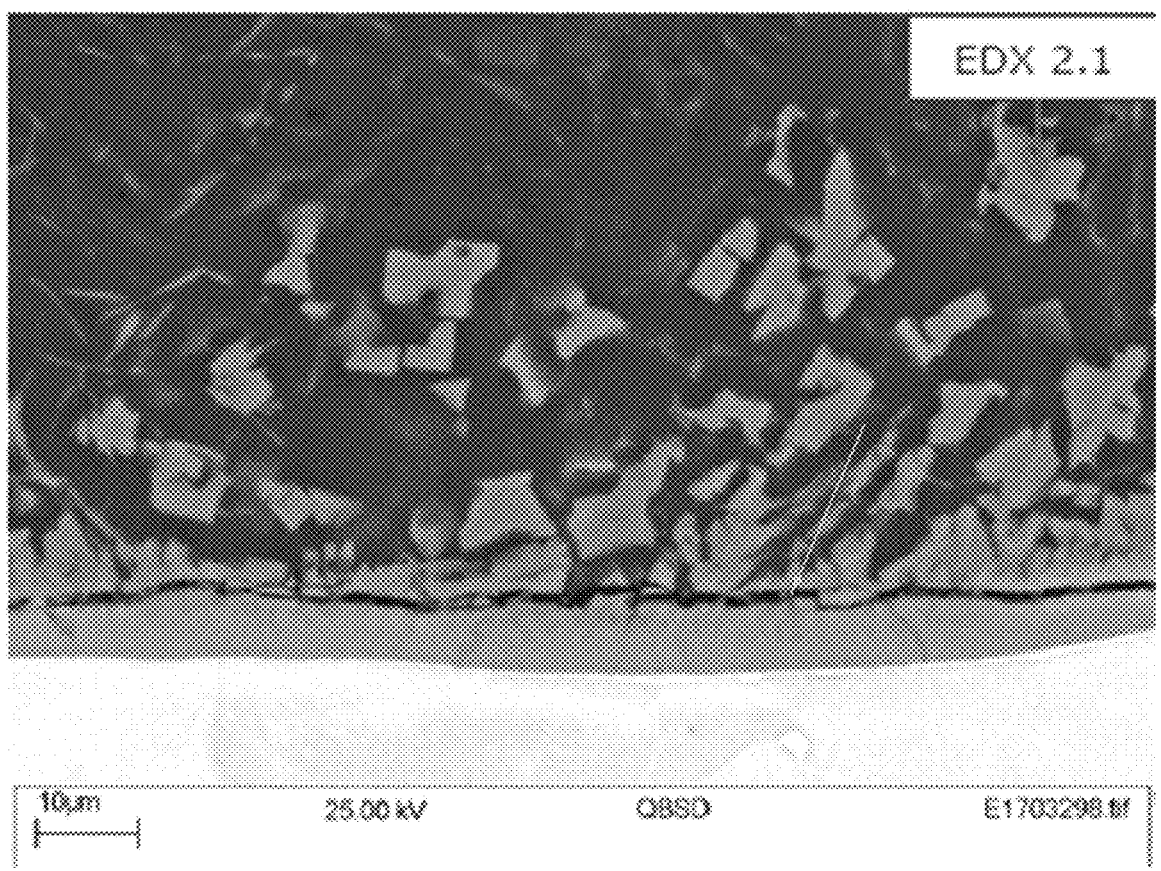
FIG. 13 shows a result of a scanning electron microscope analysis for a part of the interface of FIG. 12.

In addition, FIG. 12 shows an interface in Comparative Example 1 observed with the optical microscope, and FIG. 13 is a scanning electron microscope analysis result of a box portion in FIG. 12.

Although the joining portion appeared to be good in FIG. 12, cracks were observed along the intermetallic compounds as shown in FIG. 13, such that crack may be a factor of deterioration of the joining strength.

Figure 14:
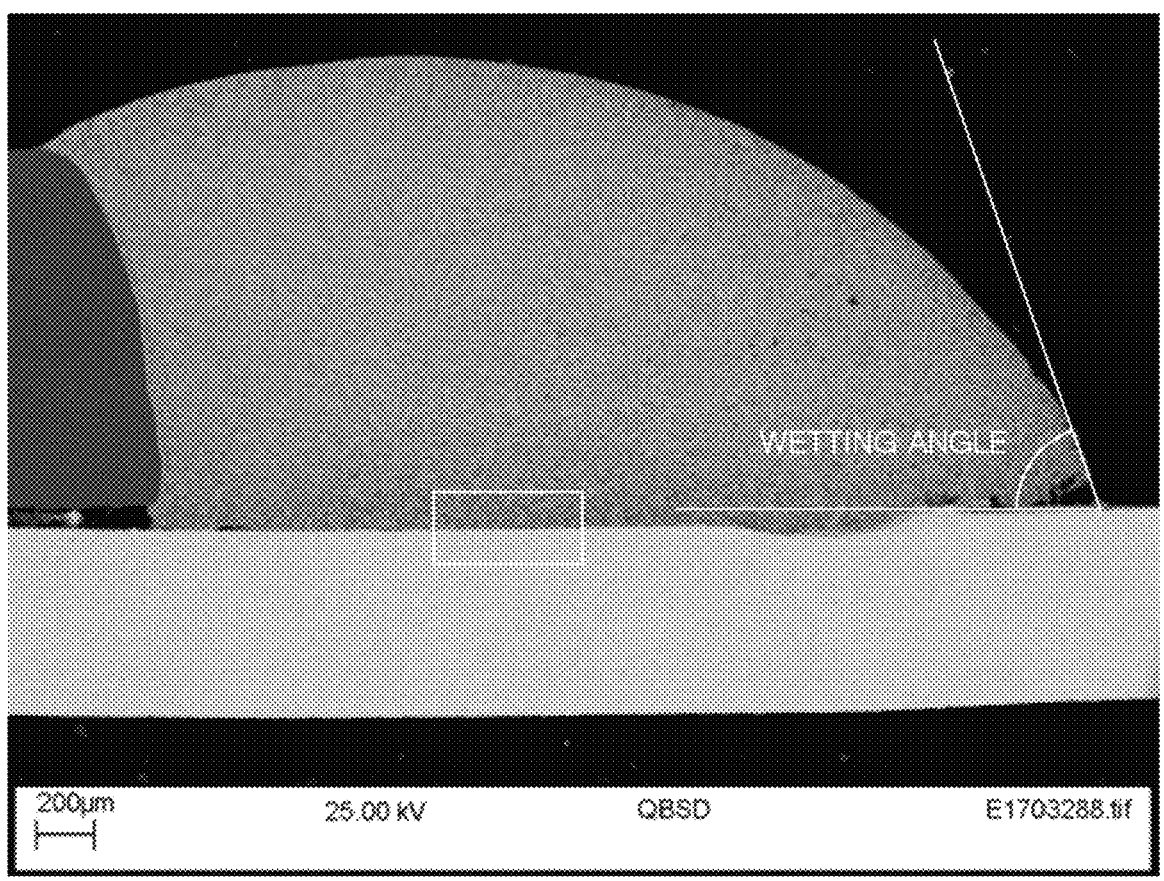
FIG. 14 shows an interface obtained by another comparative example.
Figure 15:
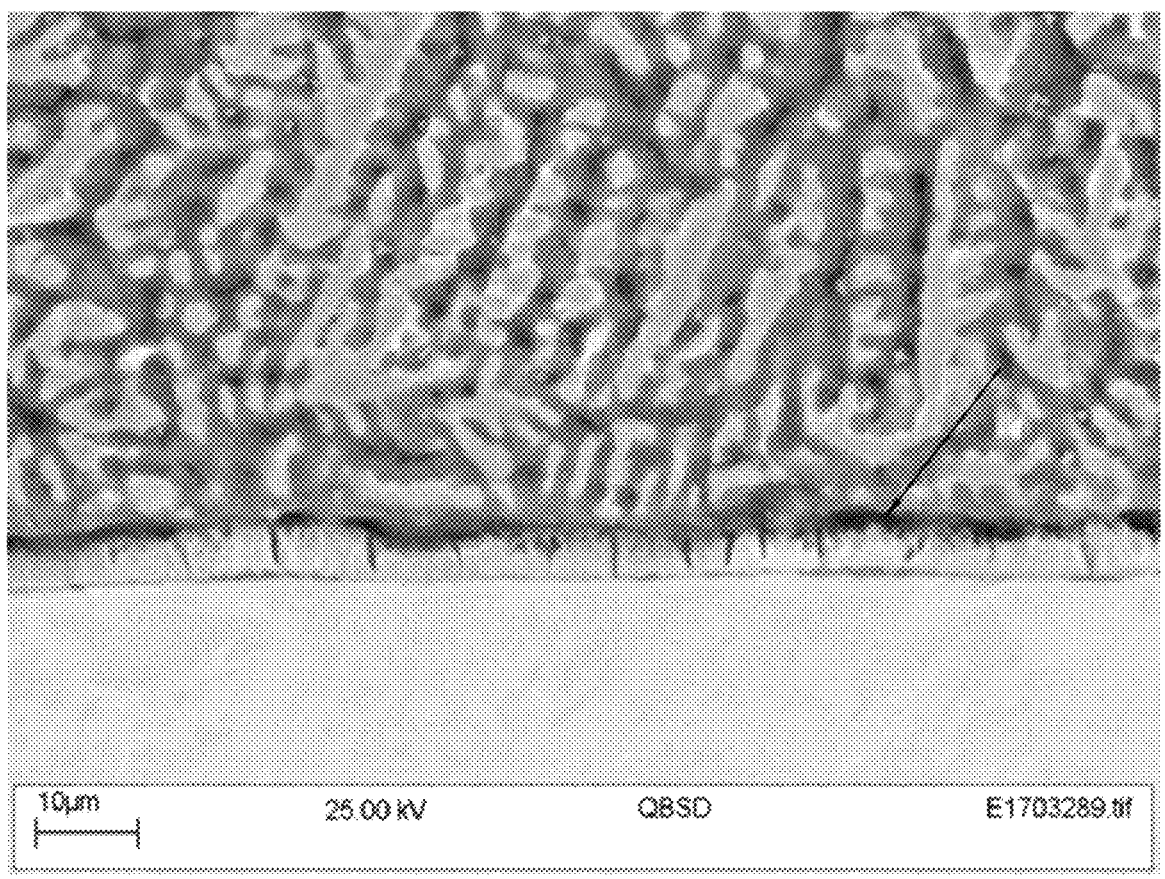
FIG. 15 shows a result of a scanning electron microscope analysis for a part of the interface of FIG. 14.

FIG. 14 shows an interface in Comparative Example 2 observed with the optical microscope, and FIG. 15 is a scanning electron microscope analysis result of a box portion in FIG. 14. For instance, wettability was deteriorated (increase of wetting angle) because the melting point of the sheath was increased and interface microcracks were observed as shown in FIG. 15, which may deteriorate the joining strength.

By applying the filler wire for aluminum-steel brazing according to various exemplary embodiments of the present invention, the interface may not be peeled during brazing even under high-speed condition, such that the stable joining strength may be obtained, and pores of less than 3% may be generated in the brazing seam, this condition may be satisfied the ISO 13919-2 standard.

In addition, since there is no sludge and other residues on an appearance of brazing portion, an additional cleaning process may not be performed after brazing.

As described above, when the filler wire of the present invention is applied, joining strength of brazing portion between aluminum and steel may be improved and productivity may be increased, so that cost and weight thereof may be reduced as compared with the conventional mechanical joining under the condition that aluminum is inevitably employed for lightening a vehicle.

Although the above-described present invention has been described with reference to the illustrated drawings, it will be apparent to those skilled in the art that various changes and modifications can be made without departing from the scope of the present invention. Accordingly, such modifications or changes should be considered as being fallen with the claims of the present invention, and the scope of the present invention should be construed on the basis of the appended claims.

What is claimed is:

1. A filler wire comprising:
   a rod comprising an aluminum-silicon (Al—Si) alloy powder and a halide flux powder; and
   a sheath comprising a zinc (Zn) alloy and surrounding the rod.

2. The filler wire of claim 1, wherein the halide flux powder is a fluoride flux powder or a chloride flux powder.

3. The filler wire of claim 2, wherein the halide flux powder is the fluoride flux powder.

4. The filler wire of claim 1, wherein the sheath has a thickness of about D/2×0.1 to D/2×0.5, wherein D is a diameter of the filler wire.

5. The filler wire of claim 1, wherein a plurality of bending grooves are formed on the filler wire at a predetermined distance in a longitudinal direction.

6. The filler wire of claim 5, wherein the bending groove has a longitudinal length of about D to D×10, wherein D is a diameter of the filler wire.

7. The filler wire of claim 5, wherein the predetermined distance between the bending grooves is equal to or less than about D×30.

8. The filler wire of claim 5, wherein each of the bending grooves has a depth of about D/2×0.1 to D/2×0.7.

9. The filler wire of claim 5, wherein each of the bending groove has a longitudinal length of about D to D×10 and a depth of about D/2×0.1 to D/2×0.7, and the predetermined distance between the bending grooves is equal to or less than about D×30 wherein D is a diameter of the filler wire.

10. The filler wire of claim 1, wherein the zinc alloy comprises aluminum (Al) in an amount of about 3 to 20 wt %, silicon (Si) in an amount of about 0.1 to 1.0 wt % and zinc constituting the remaining balance of the zinc alloy, all wt % are based on the total weight of the zinc alloy.

11. A method of joining parts, comprising applying a filler wire of claim 1 at a brazing portion, wherein the brazing portion joins one or more parts comprising different materials.

12. The method of claim 11, wherein the different materials comprise aluminum alloy and steel.

13. A vehicle manufactured by a method of claim 11.

* * * * *